United States Patent [19]

Depenbrock

[11] 4,174,497
[45] Nov. 13, 1979

[54] CIRCUIT AND METHOD FOR CONTROLLING REACTIVE LOAD CURRENTS OF A THREE-PHASE SYSTEM

[75] Inventor: Manfred Depenbrock, Bochum, Fed. Rep. of Germany

[73] Assignee: Brown, Boveri & Cie Aktiengesellschaft, Mannheim-Käfertal, Fed. Rep. of Germany

[21] Appl. No.: 839,038

[22] Filed: Oct. 3, 1977

[30] Foreign Application Priority Data

Oct. 2, 1976 [DE] Fed. Rep. of Germany ....... 2644682

[51] Int. Cl.$^2$ .............................................. H02J 3/18
[52] U.S. Cl. ................................................. 323/119
[58] Field of Search ........................ 323/101, 119, 128

[56] References Cited

U.S. PATENT DOCUMENTS 3,999,117 12/1976 Gyugyi et al. ...................... 323/119

OTHER PUBLICATIONS

Harashima, et al., "A Closed-Loop Control System for the Reduction of Reactive Power Required by Electronic Converters", IEEE Transactions on Industrial Electronics & Control Instrumentation, vol. IECI-23, No. 2, May 1976, pp. 162-166, 323-119.

Primary Examiner—A. D. Pellinen
Attorney, Agent, or Firm—Herbert L. Lerner

[57] ABSTRACT

Circuit for controlling reactive currents of a three-phase network, having three converters with forced commutation connected in parallel with the loads of the three-phase network, at least one energy accumulator connected to the d-c side of the converter, and a closed control loop having measuring transformers for input currents of the converter, for the load currents and for the conductor voltages of the network, means for evaluating required compensation currents and means for controlling firing pulse formers for the converters to adjust the waveform of the currents on the three-phase side, including capacitors shunted across the loads in three phases, the compensation control element being a three-phase four-quadrant control element, the energy accumulator being an additional capacitor and a resonant circuit tuned to twice the network frequency, the resonant circuit being connected in parallel to the additional capacitor, the control loop including means for controlling the mean voltage on the d-c side of the four-quadrant control device, a conductance measuring converter connected to the measuring transformers for the load currents and an active-current reference-value generator connected to the conductance measuring converter.

12 Claims, 5 Drawing Figures

CIRCUIT AND METHOD FOR CONTROLLING REACTIVE LOAD CURRENTS OF A THREE-PHASE SYSTEM

The invention relates to a circuit arrangement for compensating and balancing or symmetricing rapidly variable reactive currents of loads connected to a three-phase system having as the compensation control element, at least one converter with forced commutation, which is connected to the three-phase system parallel to the loads, on the d-c side of which at least one energy accumulator is connected, and a closed control loop which comprises measuring transformers for the input currents of the converter, measuring transformers for the load currents and measuring transformers for the conductor voltages of the three-phase system, and evaluating devices which determine the required compensation currents or effect the adjustment of the waveform of the currents on the three-phase side via firing pulse formers for the converters.

Arrangements for compensating and balancing rapidly variable reactive currents such as occur, for instance, in three-phase arc furnaces, are necessary in order to avoid voltage variations in the supply network, which cause disturbances in other consumers, e.g. an objectionable fluctuation of the light flux of incandescent lamps. According to the state of the art, rapidly variable reactive currents can be compensated and balanced via capacitors that can be switched on and off by thyristors, or by switchable chokes, combined with unswitched capacitors. It is only practical to switch capacitors by means of semiconductors at the voltage maximum, i.e. after each switching action, the current of the switch capacitor cannot be influenced any more for the next full half-period. While in the case of switched chokes, the fundamental cycle of the reactive power can be adjusted continuously by controlling the phase of the switching instant, the current of the choke can no longer be influenced during the next half-period if the switching instant is at or shortly after the voltage maximum. The consequence of these dead times is that the setting-in of the current of a consumer, e.g. an arc furnace, at the voltage maximum or shortly after, cannot be compensated by means of the customary arrangements during the first of the following half-periods. If such events occur with a frequency within the frequency range in which the human eye reacts very sensitively to brightness fluctuations, e.g. at a frequency of 7 Hz, then the known arrangements for compensating and balancing rapidly variable reactive loads are therefore incapable of preventing the effect called "flicker", and an objectionable variation of the light flux of incandescent lamps will be noticed. As objectionable reactions on the network also becomes more frequent due to the increased use of electronic control equipment with phase-gating control, measures must be taken in any event to reduce the reactions on the system (see also DIN EN 5006 of July, 1974.

In one circuit arrangement of the type mentioned at the outset (IEEE Transactions on Industrial Electronics and Control Instrumentation, Vol. IEEE - 23, No. 2, May 1976, pages 162 to 166), the objective is to avoid using the aforementioned capacitors for the compensation of reactive currents. In the known case, a controlled source of reactive power is used, which consists of an inverter with forced commutation and a d-c choke. The inverter is connected in shunt across the load. By measuring the a-c voltage on the input side, the load current and the current of the reactive-power source, and by evaluating these variables and calculating the compensation current as well as by comparing the latter with the current of the reactive-power source and feeding this difference signal to the pulse width modulator, which is already provided in the firing-pulse former of the inverter, the gate control of the inverter is influenced in such a manner that a compensation current comes about. The modulation frequency component of the inverter output current is eliminated by a filter. The inverter therefore forms a demand current source together with the choke. The necessary energy is replenished by the a-c current source which is common with the load. The known system can be extended to three-phase circuits. Although fast reactions to load changes are already attainable with the known system, a time corresponding to a half-period of the frequency of the a-c supply network elapses until the actual control action takes place (article cited, page 163, right-hand column, page 166, item 3).

It is accordingly an object of the invention, beginning with the circuit arrangement of the type mentioned at the outset, to provide a circuit arrangement which accomplishes the compensation and balancing of very rapidly variable reactive loads without objectionable dead times.

With the foregoing and other objects in view, there is provided in accordance with the invention, a circuit assembly for compensating and balancing rapidly variable reactive currents of loads connected to a three-phase network, the circuit assembly having a compensation control element in the form of at least one converter with forced commuation connected in parallel with the loads of the three-phase network, at least one energy accumulator connected to the d-c side of the converter, and a closed control loop having measuring transformers for input currents ($i_R$, $i_S$, $i_T$) of the converter, measuring transformers for the currents ($i_{RO}$, $i_{SO}$, $i_{TO}$) and measuring transformers for the conductor voltages ($u_{RO}$, $u_{SO}$, $u_{TO}$) of the three-phase network, means for evaluating required compensation currents and means for controlling firing pulse formers for the converters to adjust the waveform of the currents on the three-phase side, including capacitors shunted across the loads in three phases, the compensation control element being in the form of a three-phase four-quadrant control element, the energy accumulator being in the form of an additional capacitor and a resonant circuit tuned to twice the network frequency, the resonant circuit being connected in parallel to the additional capacitor, the control loop including means for controlling the mean voltage ($U_C$) on the d-c side of the four-quadrant control device, a conductance measuring converter connected to the measuring transformers for the load currents ($i_{RO}$, $i_{SO}$, $i_{TO}$) and an active-current reference-value generator connected to the conductance measuring converter.

The combination of a four-quadrant control element with a d-c voltage capacitor and a filter tuned to twice the network frequency as an energy accumulator is known as such as a pure feeding circuit for a d-c load. (German Offenlegungsschrift Dt-OS No. 2,217,023, which corresponds to U.S. Pat. No. 3,909,698). In the instant application, the three-phase four-quadrant control element operated in pulse operation is used as the compensation control element.

With the free-running inverter used in the known circuit in the above-mentioned IEEE article, the four-quadrant control element has the advantage that the waveform of its a-c currents can be quickly and accurately made to follow the predetermined set values, such as by on-off control.

It is a further object of the invention to provide a method for compensating and balancing rapidly variable reactive currents, in which the hight control speed of four-quadrant control elements, known per se, can actually be exploited.

The essence of the solution is that, in accordance with the invention, the active component of the currents of the compensation control element is determined by the latter's desired conductance value and that as set values for the reactive currents of the compensation control element, the instantaneous sum values of the currents of the consumer and the three-phase capacitor are measured directly and without delay and are reduced by the active components of the in-phase system of the consumer currents, where the active component is generated by means of the conductance converter by automatic multiplication of a quantity proportional to the actual value of the conductance of the consumer by quantities which are proportional to the waveform of the voltages of the three-phase network; and that the magnitude of the desired value for the conductance of the compensation control element or those of the four-quadrant control elements used as the compensation control element, is determined by the device for controlling the mean voltage on the d-c side of the four-quadrant control elements.

Instead of the control methods customary heretofore, which are based, for instance, on the balancing formulas of Steinmetz, a method is used which operates basically differently.

The measuring transformers used heretofore furnish amplitude values for the currents to be supplied by the compensating device. If no specific assumptions must be made as to the type of waveform of the consumer currents (which is the case with rapidly variable currents), the appropriate computer furnishes the values for the active and reactive powers of the consumer with a delay, which is in the most favorable case one period of the network frequency. The principle, to form the amplitude of the reactive current of a consumer as fast as possible via measuring transformers and to use these quantities as the reference value for the control element current amplitude, is therefore unusable for arrangements which are to compensate the changes of the reactive current instantaneously. On the other hand, using the measures of the present invention indicated above, the quantities which correspond to the waveform of the active components of the in-phase system and which are to be subtracted from the measured total currents of the consumer, are determined to obtain the reference value for the consumer current components to be compensated by the control element.

In the event of a jump in the active load, the conductance measuring converter can generally furnish the correct measurement value at the earliest after one period. Since in the first period after an active-power jump, the waveform of the output signal of the measuring converter generally does not yet correspond to the mean power of the active load, the set values of the ac-currents of the four-quadrant control element contain, after an active-power jump, components which have the consequence that overall, a finite amount of energy is supplied to or taken from the compensating arrangement. Thereby, an active-power jump is experienced in the supply network only in mitigated form. Contrary to the known arrangements for compensating and balancing rapidly variable consumers, the unavoidable measuring times of measuring converters do not lead to a brief load on the network by properly-to-be-compensated reactive currents, but to relieving the network of properly-to-be-supplied active currents. The amounts of energy to be supplied or taken up in the case of real-load jumps by the three-phase four-quadrant control element come substantially from the energy content of the capacitor on the d-c side. Since, ultimately, the entire energy required by the consumer and the three-phase four-quadrant control element is to be supplied by the network, an additional small active-current component, which changes only relatively slowly, is superimposed, according to the invention, by adjusting the voltage of the capacitor on the d-c side to the desired value of the control element currents, if this voltage deviates from its desired (set) value. Through the corresponding active component of the control element current, energy is supplied or removed at the capacitor on the d-c side, so that the mean of the capacitor voltage remains constant.

Contrary to the known circuit described at the outset, the capacitors connected parallel to the consumer or consumers are not dispensed with but are retained for compensating the reactive power, so that the compensation control element serves, so to speak, as an additional regulator for the compensation and balancing of extremely rapidly variable reactive currents.

In accordance with another feature of the invention, it is provided that the three capacitor phases of the three-phase capacitors have current capacities that are each substantially one-half the magnitude of the largest load current to be compensated in the respective phase.

In accordance with a further feature of the invention, it is provided that the capacities of the three-phase capacitors are unequal and the three-phase capacitors are delta-connected.

In accordance with an additional feature of the invention, it is provided that the active-current generator comprises means for adding with respect to sign, the resultant conductance of the load and the three-phase capacitor to the set-point value of the conductance for the four-quadrant control elements, multipliers having two sets of inputs, to one set of inputs thereof is fed the quantity proportional to the sum of the resultant conductance of each phase and to the other set of inputs are fed quantities which correspond to the waveform of the voltages to which the active-current reference value to be generated is to be proportional. In such an arrangement, the output signal of the device for controlling the mean voltage on the d-c side of the compensation control element can be taken into consideration in an advantageously simple manner through the use of the summer.

In accordance with yet another feature of the invention, it is provided that the compensation control element is in the form of a delta connection of the three four-quadrant control elements.

It should be remembered, in general, that in the conductor measuring converter, the active components of the currents are to be determined. It is therefore a further object to describe an appropriate measured-value converter. The problem of determining the component of another quantity proportional to a periodic reference quantity as fast as possible can occur, however, in many other control and regulating problems, e.g. in determining current dissipation losses.

If in an application of the circuit arrangement according to the invention, the resultant reactive current of a consumer is to be compensated, the waveform of this variable can be determined by subtracting the active component from the total current. The active component $i_w$ is defined as that part of the total current which is proportional to the consumer voltage u in the mathematical sense. The remaining current $(i-i_w)$ is then orthogonal to this voltage i.e. the integral of the product u $(i-i_w)$ taken over a full period has the value zero; the current $(i-i_w)$ is a pure reactive current. Therefore, the active current forms an average value of the power with the voltage, called active power, which is identical with the active power of the consumer. As is well known, this active power is equal to the product of the r.m.s. values of the active current $I_w$ and the voltage U, $P_w = U \times I_w$. Because of the proportionality between the voltage u and the active current $i_w$, we have:

$$i_w/u = I_w/U$$

and therefore $$i_w = P_w/U^2 \cdot u.$$

This formula shows that for a periodic reference quantity u with the constant r.m.s. value U, one can reduce the determination of the component, proportional to u, of another variable i, to the product of the "active power" of these two quantities and the reference quantity u. In order to determine the active power, an integral must be taken over at least one full period. The "most recent" value of the active power is obtained if one evaluates at any instant the integral of the product u·i over the just terminated time interval of the period T. Expressed mathematically, one obtains at any instant t the "most recent" time value of the active power $P_w(t)$ according to the precept:

$$P_w(t) = (1/T) \int_{t-T}^{t} u \cdot i \, dt.$$

The waveform $i_w$ of the component, proportional to u, of i is then obtained in accordance with the relation $$i_w(t) = (1/TU^2) u(t) \int_{t-T}^{t} u \cdot i \, dt,$$

where
$i_w$ = active component of the current,
T = period of the reference quntities, of the voltages,
U = r.m.s. value of the voltage,
t = time,
and where U and T are constant, as assumed.

In a known measured-value converter of the type mentioned at the outset (W. Leonard, "Diskrete Regelsysteme" (Discrete Control Systems), B-I Hochschultaschenbuecher, pages 45 to 47, and shown in FIG. 2, the same quantity is subtracted from the quantity $p(t) = u \cdot i$ in a summing device 125, but delayed by the period T. The result is integrated in an integrator 105. One then obtains the desired signal $$T \, P_w = \int_{t-T}^{t} u \cdot i \, dt.$$

The known measured-value converter functions only under the condition that all elements work completely without error. Any error, no matter how small, in the operation of the three required functional elements can grow throgh the integration into errors of any magnitude in the output signal.

It is therefore another object of the invention to construct a measured-value converter, in which the output signal contains only errors which are of an order comparable to the errors of the individual functional elements which were put in, and not have them compounded.

In accordance with yet a further feature of the invention, there is provided a measured-value converter for a circuit arrangement for compensating and balancing rapidly variable reactive currents of loads connected to three-phase system for determining a component of, or a component proportional to, a periodically oscillating electrical reference quantity, and a component from the group of a voltage and a current (i) in accordance with the equation:

$$i_w(t) = (1/TU^2) \cdot u(t) \int_{t-T}^{t} u \cdot i \, dt,$$

where
$i_w$ = active component of the current,
T = period of the reference quantity, of the voltages
U = r.m.s. value of the voltage,
t, = time,
and having at least one multiplier on the input side for forming the product of the current and the reference quanity, a dead time member with a signal propogation time equal to the period (T), and at least one integrator, includes the integrator having controlled resettability, the input of the integrator being connected to the output of said multiplier, so as to sum the output variables, the integrator being resettable after each period (T) to a defined value, a sample-and-hold member operating with the same period (T), the inputs of the deat time member and the sample-and-hold member being jointly connected to the output of the integrator, the sample-and-hold member storing the output variable of the integrator before the integrator is reset, and includes a summer and another multiplier having first and second inputs, the outputs of the sample-and-hold member, the integrator and the inverted output of the dead time member are jointly connected to the inputs of the summer, the output of the summer being connected to a first input of the other multiplier the periodic reference quantity being connected to the second input of the multiplier.

By adjusting the functional elements accurately to one period of the reference quantity and in particular, by separating the further evaluation from the integrator output by the sample-and-hold member, the addition of errors is advantageously avoided.

In accordance with yet an additional feature of the invention, it is provided that the dead time member is in the form of a series-analog time delay circuit controllable by clock pulses, and including a frequency multiplier, the output of which is connected to the clock pulse input of the time delay circuit, the inpur of the frequency multiplier being connected to the resetting line of the integrator.

If one considers the time behavior of the measured-value converter for the special case in which the sum of the products u·i jumps from the value zero to a constant value and if one compares, as will be explained in greater detail in connection with the following embodiment example, the determined "active work" with the actual work, the integral over the product sums of the input variables, a difference is found. For compensating this difference, one embodiment of the measured-value transformer provides, according to the invention includes a further summer and a further dead time member, the output of which is connected to the other multiplier to complement the signal jointly fed to the other multiplier by a first component in the signal path, the dead time ($T_t$) of the further dead time member having the value k·T, k being a constant, the output variable of the further dead time member being amplified by a first factor ($V_1$) and subtracted in the further summer from the common signal, which is first amplified by a second factor ($V_2$) for complementation by a second component.

In accordance with still another feature of the invention, it is provided that the first factor ($V_1$) and the second factor ($V_2$) are equal to twice the reciprocal constant ($\frac{1}{2}$k).

In accordance with still a further feature of the invention, it is provided that the constant (k) has a value of substantially 0.5.

In accordance with an additional feature of the invention, there is provided another further summer and an m-bit analog-to-digital converter, and a first and a second digital-to-analog converter connected ahead of the two further summers in the signal path between the output of the integrator and the digital dead time member and the further connected digital sample-and-hold member, the first digital-to-analog converter being connected between the summer and the one further summer and the second digital-to-analog converter being connected between the further dead time member and the other further summer, the other further summer operates as a NOT gate and is connected on the output side thereof to the one further summer.

In accordance with a concomitant feature of the invention, there is provided an additional summer, the inputs of which are connected to the outputs of the further multipliers, the output of the additional summer forming the third proportional current component belonging to a three-phase voltage system from the two first current components which correspond to the multiplier outputs.

In accordance with the method of the invention, there is provided a method for compensating and balancing rapidly variable reactive currents of loads connected to a three-phase network, wherein reference values are formed by measuring and evaluating the circuit currents and the voltages of the three-phase network, for forming control pulses for a converter compensation control element by means of a circuit arrangement which includes determining the active component of the currents of the compensation control element from the conductance reference value thereof, measuring the instantaneous sum values of the currents of the load and the three-phase capacitor directly and without delay as reference values for the reactive currents of the compensation control element, reducing the instantaneous sum values by the active component of the in-phase system of the load currents, generating the active component by means of the conductance converter by automatically multiplying a quantity proportional to the conductance of the load by quantities which are proportional to the waveform of the voltages of the three-phase network, and determining the magnitude of the reference values for the conductance of the compensation control element from the device for controlling the mean voltage on the d-c side of the four-quadrant control elements.

Other features which are considered as characteristic for the invention are set forth in the appended claims.

Although the invention is illustrated and described herein as embodied in circuit assembly and method for compensating and balancing rapidly variable reactive currents of loads connected to a three-phase system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Figure 1:
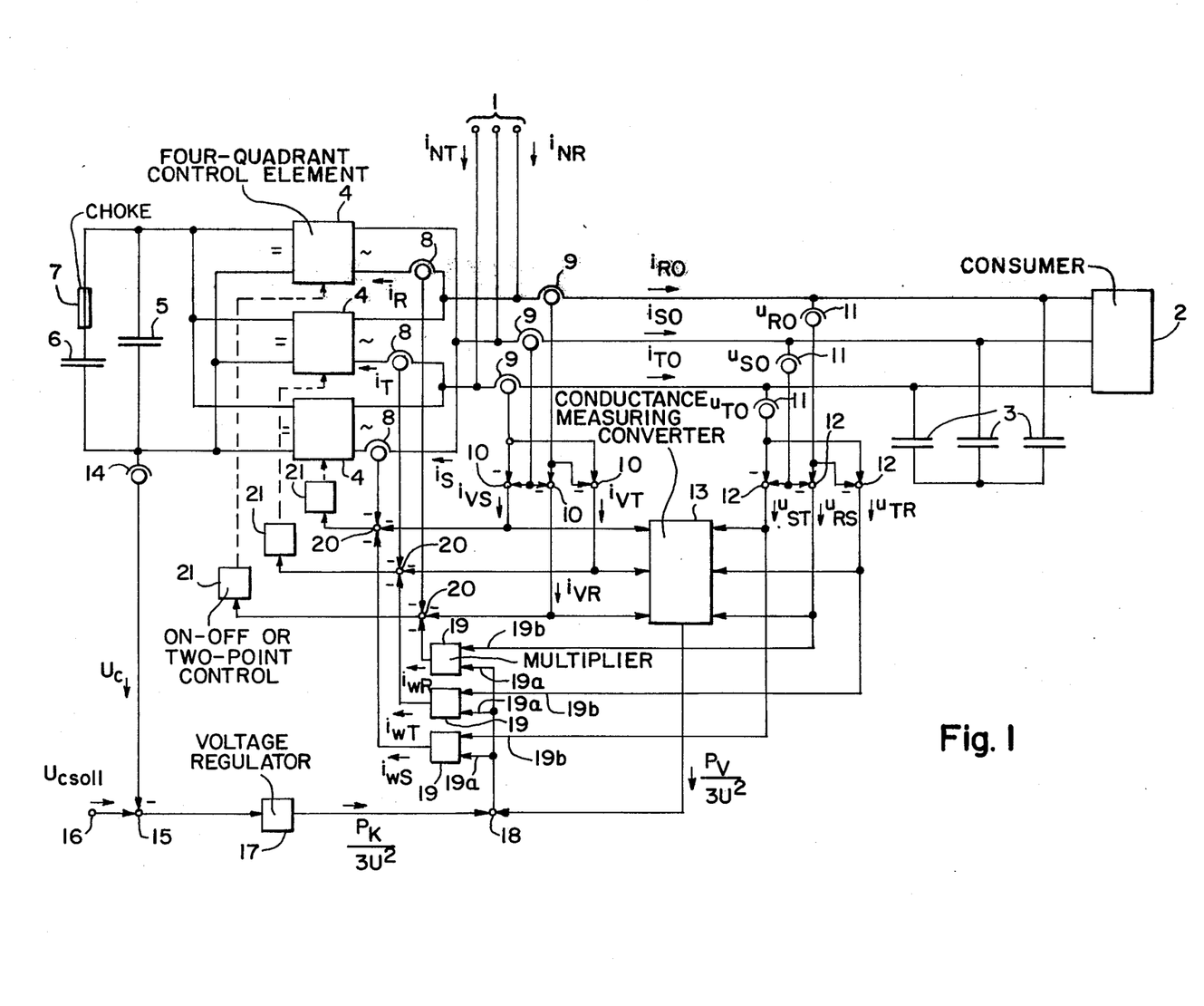
FIG. 1 is a schematic diagram of a circuit arrangement for compensating and balancing rapidly variable reactive currents according to the invention.

Referring now to the figures of the drawings, and first, particularly to FIG. 1 thereof, there is shown a symmetrical three-phase power supply system 1 that feeds a consumer 2, which is to be compensated and balanced. For this purpose, a three-phase capacitor 3 is shunted across the consumer. The individual capacitors are preferably constructed so that they each can carry currents which are about one-half of the largest reactive and unbalanced currents to be compensated in the individual consumer phases. If according to this rule, capacitors with different capacity values are used, then one will advantageously use the delta or 3-way connection shown for the capacitor battery 3, since then all the capacitors are to be constructed for the same voltage. A delta connection of three four-quadrant control elements 4 is provided in shunt with the consumer 2 as the compensating control element for compensating the resultant reactive current of the consumer 2 and the capacitor battery 3. The construction of such control elements is known, for example, from U.S. Pat. No. 3,909,698. The d-c leads of the control elements 4 are all connected in parallel and to a common d-c voltage capacitor 5 as well as, in a conventional manner known, for example, from U.S. Pat. No. 3,909,698, to a resonant circuit tuned to twice the network frequency. The resonant circuit is formed of a capacitor 6 in series with a choke 7 and serves to compensate consumer power pulsating with twice the network frequency. Power pulsations of twice the network frequency are caused, for example, by inverter current systems or converting the invention to a single-phase system.

The circuit arrangement according to FIG. 1 also contains the following elements:

Measuring transformers 8 for measuring the control element currents $i_R$, $i_S$, $i_T$;

Measuring transformers 9 for measuring the currents $i_{RO}$, $i_{SO}$, $i_{TO}$ which lead to the three-phase capacitor 3 and the consumer 2;

Three first summers 10 connected to the measuring transformers 9;

Measuring transformers 11 for picking up the a-c voltages $u_{RO}$, $u_{SO}$, $u_{TO}$;

Three second summers 12 connected to the measuring transformers 11;

A conductance measuring converter 13, to which the outputs of the summers 10 and 12 are connected;

A measuring transformer 14 for picking up the d-c voltage $U_c$ on the d-c side of the control elements 4;

A third summer 15, connected to the latter, with a set-value input 16 for the d-c voltage reference value $U_{csoll}$;

A voltage regulator 17, the input of which is connected to the third summer 15, and the output of which is connected to a fourth summer 18. The output of the conductance measuring converter 13 being simultaneously connected to the fourth summer 18;

Three multipliers 19, each having a first input 19a and a second input 19b, the output of the fourth summer 18 being jointly connected to each of the first inputs 19a, and the respective corresponding outputs of the second summer 12 being connected to the second inputs 19b;

Three fifth summers 20, each of which have three inputs, these inputs being connected to the respective outputs of the multipliers 19, and to the respective outputs of the first summer 10 and the measuring transformer 8;

On the output side, the fifth summers 20 are connected to a respective on-off or two-point control 21, and to control sets which form the control pulses for the control elements 4. These control sets are of conventional construction well-known in the art and are therefore not shown or described in detail herein.

The operation of the circuit arrangement of FIG.1 is hereinafter explained:

The actual values of the three control element currents $i_R$, $i_S$, $i_T$ are measured by the current transformers 8, subtracted in summers 20 from their three setpoint values, and the resulting control deviations are fed to three on-off controllers 21. The on-off controls 21 control the output voltage by switching the valves of the associated control elements 4 on and off in a conventional manner so that the control deviation of the three currents $i_R$, $i_S$ and $i_T$ remains within the permitted tolerance band. The setpoint values of the control element currents are composed of two components which are combined in the summers 20. The first component $i_{VR}$, $i_{VS}$, $i_{VT}$ is formed from the currents $i_{RO}$, $i_{SO}$ and $i_{TO}$ measured by the current transformers 9, in the summers 10 according to the following prescription:

$$i_{VR} = +\tfrac{1}{3}(i_{RO} - i_{SO})$$

$$i_{VS} = +\tfrac{1}{3}(i_{SO} - i_{TO})$$

$$i_{VT} = +\tfrac{1}{3}(i_{TO} - i_{RO})$$

The factor of $\tfrac{1}{3}$ takes into account the choice of the turns ratio of the current transformers.

Analogously, the measured values of the voltages $u_{RS}$, $u_{ST}$, $u_{TR}$ between the conductors are formed in the summers 12 from the voltages $u_{RO}$, $u_{SO}$ and $u_{TO}$ measured by the voltage transformers 11 according to the following prescription:

$$u_{RS} = u_{RO} - u_{SO}$$

$$u_{ST} = u_{SO} - u_{TO}$$

$$u_{TR} = u_{TO} - u_{RO}$$

In the measuring converter 13, which will be explained further hereinafter with the aid of the other figures, a measurement value is formed from the instantaneous values of the currents and voltages, which correspond to the three-phase conductance of the consumer 2. This can be accomplished, for example, according to the following prescription:

$$\frac{P_V}{3U^2} = \frac{1}{3U^2} \cdot \frac{1}{T} \int_{t-T}^{t} (i_{VR} \cdot u_{RS} + i_{VS} \cdot u_{ST} + i_{VT} \cdot u_{TR}) dt$$

where
T=period of the network frequency, and
$P_V$=consumer power.

The factor $(1/3U^2)(1/T)$ can be taken outside the integral since it is a constant if the network voltage and frequency are constant; U is the r.m.s. or root mean square value of the symmetrical voltages $u_{RS}$, $u_{ST}$, $u_{TR}$. In the summer 18, the quantity $P_K/3U^2$ is added to the quantity $P_V/3U^2$ obtained from the measuring converter 13. The quantity $P_K/3U^2$ represents the setpoint value of the conductance of the control elements 4. The quantity $P_K/3U^2$ is formed by the voltage regulator 17 in a known manner from the difference between the ideal constant reference value 16 of the voltage of the capacitor 5 on the one hand and the actual value of the voltage of the capacitor 5 on the other hand, which is transmitted in the measuring transformer 14 and is subtracted from the reference value in the summer 15. If the actual value of the capacitor voltage as transmitted by the measuring transformer 14 is too small, the control amplifier 17 furnishes a positive value for the quantity $P_K/3U^2$ so that energy is supplied to the capacitor 5 on the d-c side of the control elements to bring it up to the required value. In the multipliers 19, the quantity $(P_K+P_V)/3U^2$ formed in the summer 18 is multiplied by the voltages $u_{RS}$, $u_{ST}$, $u_{TR}$, respectively received from the voltage measuring transformers 11. The result is the waveform for the reference values of the active currents:

$$i_{wR} = (P_K + P_V)/3U^2 \cdot u_R$$

$$i_{wS} = (P_K + P_V)/3U^2 \cdot u_S$$

$$i_{wT} = (P_K + P_V)/3U^2 \cdot u_T$$

These currents which are the first components introduced into the summers 20 all have the same amplitude and constitute a symmetrical in-phase system, exactly like the voltages $u_R$, $u_S$, $u_T$. The second components for the reference values of the control element currents $i_R$, $i_S$ and $i_T$ are added in the summers 20 to the third component, the directly measured currents $-i_{VR}$, $-i_{VS}$ and $-i_{VT}$.

For the control deviations acting on the on-off control 21, we have therefore the sum of these three components:

$$x_R = i_{WR} - i_R - i_{VR}$$

$$x_S = i_{WS} - i_S - i_{VS}$$

$$x_T = i_{WT} - i_t - i_{VT}$$

In general, it can be asumed that the control deviation $x_R$, $x_S$, $x_T$ are negligibly small; then we have:

$$i_R + i_{VR} = i_{wR}$$

$$i_S + i_{VS} = i_{wS}$$

$$i_T + i_{VT} = i_{wT}$$

i.e., the consumer currents $i_V$ and compensator currents $i_W$ complement each other to add up to pure active currents i.

Thus, one obtains the network currents as follows:

$$i_{NR} = i_{wR} - i_{wT}$$

$$i_{NS} = i_{wS} - i_{wR}$$

$$i_{NT} = i_{wT} - i_{wS}$$

These currents form, like the currents $i_{wR}$, $i_{wS}$ and $i_{wT}$, a symmetrical in-phase system and are proportional to the voltages $u_{RO}$, $u_{SO}$, $u_{TO}$.

The following discussion relates to the measured-value converter 13.

The measured-value converter according to the invention can perform with analog or digital circuits with respect to both of two embodiment variants. The first variant is constructed as an example in analog technology and will be explained by reference to FIG. 3, and the direction of the signal flow therein.

Figure 3:
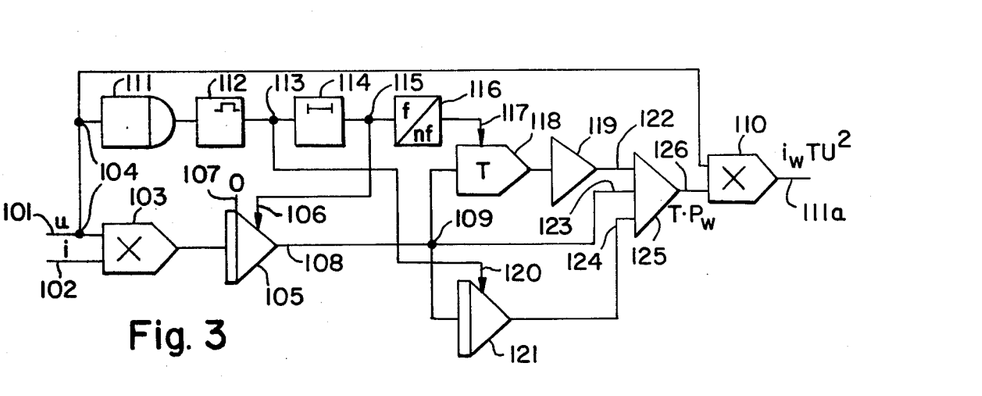
FIG. 3 is a block diagram of a first variant of the measured-value converter according to the invention.

The outputs of measured-value transmitters for the current i and the voltage u are connected to two inputs 101 and 102, respectively, of a multiplier 103. A first branching point 104, shown as two points for clarity, is located at the voltage input 101. The multiplier 103 is followed in the signal path by an integrator 105 with a resetting input 106 and a clearing input 107. A second branching point 109 is located at the output 108 of the integrator 105.

To the first branching point 104 are connected the input of a multiplier 110 and an analog-digital switch 111, and a monostable multivibrator 112 is connected to the output of the switch 111. There is a third branching point 113 after the multivibrator 112, to which a time delay member 114 is connected. This is followed in the direction of the signal flow by a fourth branching point 115, a frequency multiplier 116 and the control input 117 of a dead time member 118, the input of which is connected to the second branching point 109 and the output of which is connected to an inverter 119.

The third branching point 113 is additionally connected to the control input 120 of a sample-and-hold member 121. At the operating input of the sample and hold member 121, the second branching point 109 is located. The fourth branching point 115 is additionally connected to the resetting input 106 of the integrator 105.

The output of the inverter 119, the second branching point 109 and the output of the sample-and-hold member 121 are connected to the inputs 122, 123 and 124, respectively, of a summer 125. The output 126 thereof is tied, as is the first branching point 104, to a corresponding input of the multiplier 110. These two inputs are tied on the output side of the multiplier 110 with an output 111a, which is connected to a reference-value former for the current and is furthermore connected to a firing pulse former of a semi-conductor control element, e.g., a four-quadrant control element.

The operation of the circuit arrangement of FIG. 3 will be explained in the following:

The quantities u and i are fed to the two inputs 101, 102 of the analog multiplier 103 and the controlled integrator 105 forms from the input signal u·i the quantity $$- \int_{qT}^{t} u \cdot i \, dt; \quad q = 0; 1; 2; \ldots$$

The analog-digital switch 111 and the monostable multivibrator 112 serve to reset the integrator 105 after every full period T to the new starting point zero. Before the integrator 105 is reset to zero at the time qT, somewhat delayed by the delay member 114, the sample-and-hold member 121 receives the quantity $$- \int_{(q-1)T}^{qT} u \cdot i \, dt$$

which is present at the output of the integrator 105 immediately before it is reset. The member 121 holds this value during the following period and passes it on to the third input 124 of the summer 125. The second input 123 of which receives the output signal of the integrator 105. This output signal from the fourth branch point 115 through the frequency multiplier 116 is also applied to the input of the dead time member 118 which is followed by the inverter 119. A series-analog delay circuit of the "bucket-brigade" type (Reticon "Sad-1024 Dual 512 Stage Analog Delay line"—Company Application), which can be controlled by clock pulses is used for the dead time member 118. The clock pulses are generated by the frequency multiplier 116 from the reset pulses, the multiplication factor n being equal to the number of steps of the dead time member 118, so that the dead time is exactly equal to one network period. To the first input 122 of the summer, the signal $$\int_{(q-1)T}^{t-T} u \cdot i \, dt$$

is therefore fed.

The output 126 of the summer 125 then furnishes the desired signal $T \cdot P_w$ which is the sum of the signals 122, 123 and 124 described above.

$$\int_{qT}^{t} u \cdot i \, dt + \int_{(q-1)T}^{qT} u \cdot i \, dt -$$

-continued
$$\int_{(q-1)T}^{t-T} u \cdot i \, dt = \int_{t-T}^{t} u \cdot i \, dt = T \cdot P_w$$

To obtain the desired components $i_w$ of the current i, the quantity $T \cdot P_w$ is multiplied by the quantity u in the multiplier 110; the result $T \cdot P_w \cdot u$ agrees with $i_w$ except for the factor $U^2 \cdot T$, which can subsequently be eliminated.

This agreement can be represented as follows:

$$T \cdot P_w \cdot u = U^2 \cdot T \cdot i_w$$

$$P_w = u \cdot i_w \quad P_w = u \cdot i_w$$

$$i_w = \frac{P_w}{u} \quad \frac{P_w}{u} = i_w$$

If the variables u and i form multi-phase systems, the arrangement needs merely to be modified by providing one multiplier 103 per phase and then feeding to the integrator 106 the sum of all products.

Figure 4:
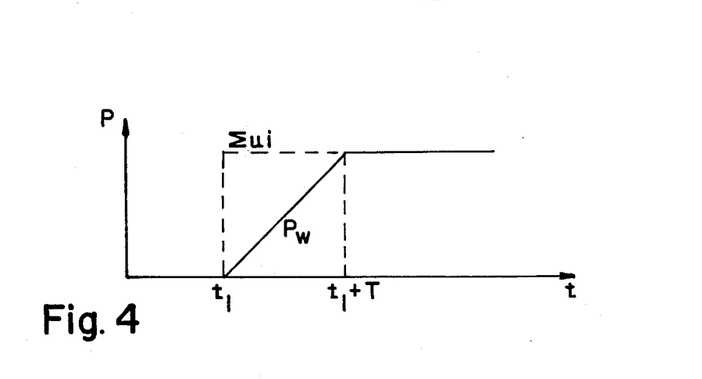
FIG. 4 is a graph of power against time for a special case of the first variant of FIG. 3.

If one considers the time behavior of the above-mentioned measured-value converter according to FIG. 3, for example, for the special case in which the sum of the products u·i, which equals P, jumps from the value zero to a constant value, then the output variable P versus time exhibits the shape shown in FIG. 4. The output variable has reached its steady-state final value exactly one period after the step-like change of the quantity u·i. If one compares the "active work"

$$W_w = \int_o^t P_w dt$$

with the actual work $$W = \int_o^t \Sigma u \cdot i \, dt,$$

then a difference is found which corresponds to the area between the two curves shown in FIG. 4. In some applications it is not only required that the measuring converter furnishes the correct value of the active power as fast as possible but that additionally, the time integral of the measurement variable $$(1/T) \int_0^t (P_w \cdot T) dt$$

coincides with the time integral of the product sum of the input variable $$\int_0^t \Sigma u \cdot i \, dt.$$

Figure 5:
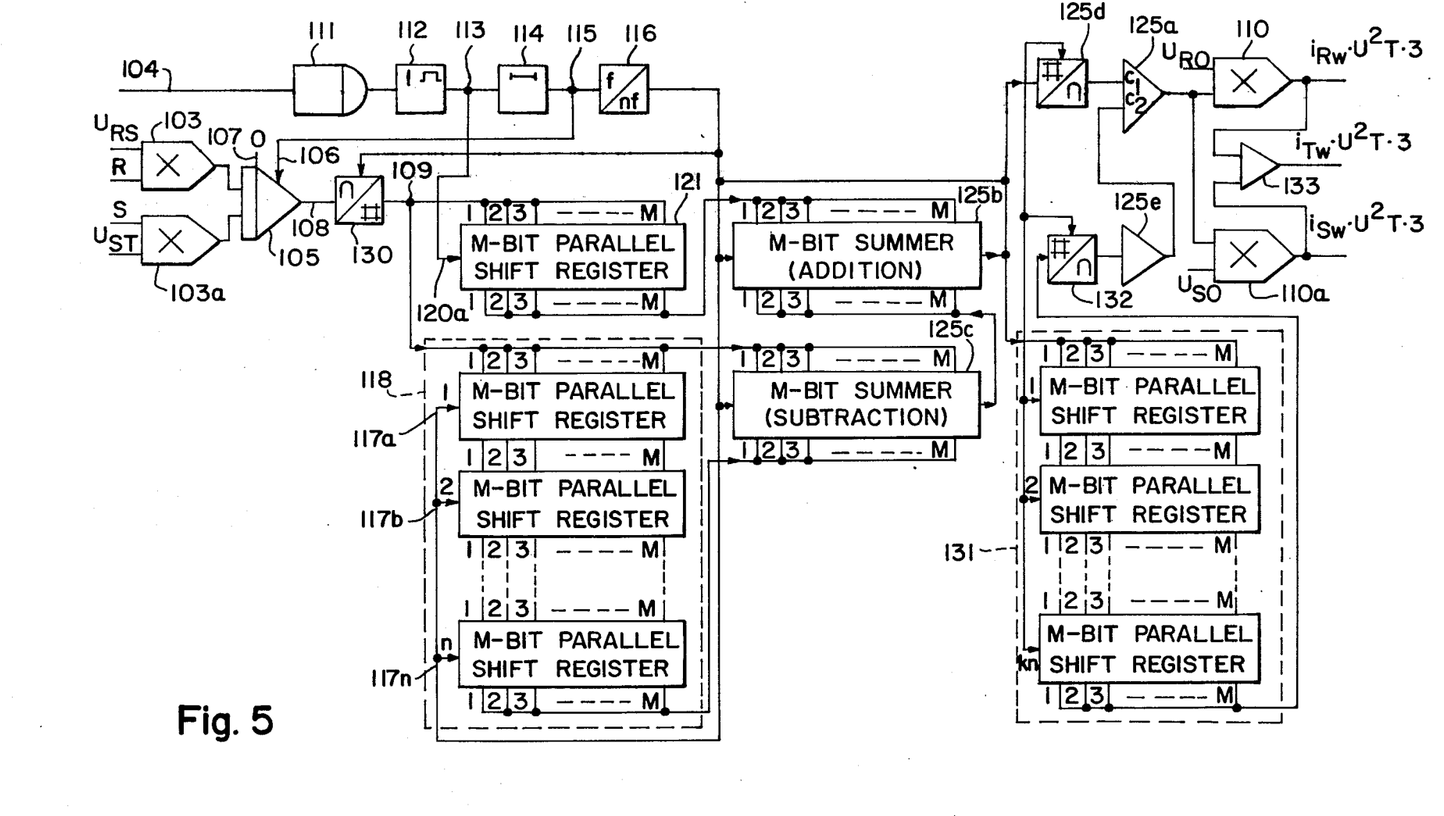
FIG. 5 is a block diagram of a second variant of the measured-value converter according to the invention.

FIG. 5 shows an embodiment example, with which this requirement can be met. In order to show that the invention can be utilized not only with analog circuit elements, a circuit is shown in FIG. 5 which contains predominantly digital circuit elements. The functional elements are numbered analogously to the corresponding elements of the arrangement shown in FIG. 3. The arrangement of the circuit is similar to that of FIG. 3, so that not all of the details are explained in the description of the operation that follows.

The total power $\Sigma u \cdot i$ is formed in accordance with the generally known Aron circuit by means of two multipliers 103 and 103a, the outputs of which are fed as summands to the integrator 105.

The integrator 105, which resets under periodic control, is followed by an m-bit analog-to-digital converter 130. The control pulses for the analog-to-digital conversion are generated, as described above, in the analog-digital switch 111 and in the multivibrator 112. The reset pulse for the integrator 105 is delayed in the delay member 114 by the analog-to-digital conversion time. The following functional groups 121, 125a to 125e, 118 simulate digitally the functions of the analog functional members 121, 125, 118 according to FIG. 3. The functional member 121, as the sample-and-hold member, is an m-bit parallel shift register. The functional member 118, as the dead time member, consists of n series-connected m-bit parallel shift registers. The functional members as summers 125b and 125c contain m-bit full adders, where a complement must be formed in 125c for the subtraction. By an m-bit digital-to-analog conversion of the output of the full adder 125b in a digital-to-analog converter 125d, the $P_w$-analog signal is obtained according to the output 126 of the summer 125 in FIG. 3.

With k·n series-connected m-bit parallel shift registers 131, a digital-to-analog converter 132, an inverter 125e as well as the summer 125a following the digital-to-analog converter 125d, with the weighting factors $c_1 = V_1$ and $c_2 = 1 + V_2$, the equality of the active work $$W_w = \int_0^t P_w(t') dt'$$

and the actual work $$W = \int_0^t \Sigma u(t') \cdot i(t') dt'$$

between steady-state conditions is achieved. The k·n series-connected parallel shift registers 131 constitute a further dead time member with the dead time $T_t = k \cdot T$.

The following relationship should preferably exist between the parameters $V_1$, $V_2$ and $T_t = k \cdot T$:

$$V_1 = \tfrac{1}{2}k; \quad V_2 = \tfrac{1}{2}k$$

A dynamic behavior that is particularly advantageous with respect to the general measurement requirements, and the condition that k·n must be an integral number of registers of the further dead time member 131, are achieved by k=0.5, where the condition of an even number for n must be observed. Conductor voltages $U_{RO}$ and $U_{SO}$, respectively, are applied as reference quantities to the second inputs of the multipliers 110, 110a on the input side. The multipliers 110 and 110a and a summer 133 connected on the output three-phase voltage system:

$i_{Rw} \cdot U^2 T \cdot 3$, $i_{Sw} \cdot U^2 T \cdot 3$ and $i_{Tw} \cdot U^2 T \cdot 3$, respectively.

Figure 2:
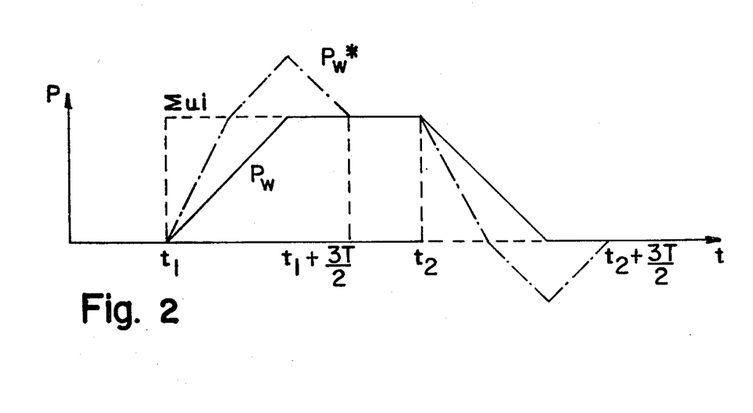
FIG. 2 is a graph of power against time for a special case of the second variant corresponding to FIG. 5.

FIG. 2 shows the operation of the compensating member under the same assumptions as in the example of FIG. 4. At the time $t = t_1$, $p(t) = \Sigma u \cdot i$ is applied in step-fashion. The difference area between p(t) and $P_w(t)$ is compensated by the compensating member. The integral of the actual work $$\int_0^{t_1 + T/2} u \cdot dt$$

is equal to the integral of the active work $$\int_0^{t_1 + 3T/2} P_w^* dt'$$

after $t=t_1+3T/2$, the determined value $P_w^*$ has assumed the steady-state value of $P_w$ as seen on the graph.

The same is true for step-like disconnecting of $\Sigma n \cdot i$ at the time $t=t_2$, where the steady-state value of $P_w$ is likewise reached after $t=t_2+3T/2$.

There are claimed:

1. Circuit assembly for compensating and balancing rapidly variable reactive currents of loads connected to a three-phase network, the circuit assembly having compensation control element in the form of three converters with forced commutation connected in parallel with the loads of the three-phase network, at least one energy accumulator connected to the d-c side of the converter, and a closed control loop having measuring transformers for the actual values of the currents ($i_R$, $i_S$, $i_T$) of the compensation control elements, measuring transformers for the actual values of the load currents ($i_{RO}$, $i_{SO}$, $i_{TO}$) and measuring transformers for determining the actual values of the voltages ($u_{RS}$, $u_{ST}$, $u_{TR}$) between the conductors of the three-phase network, and evaluator means for calculating reference values for the active currents ($i_{WR}$, $i_{WS}$, $i_{WT}$) from the actual values of the voltages ($u_{RS}$, $u_{ST}$, $u_{TR}$) and the load currents ($i_{RO}$, $i_{SO}$, $i_{TO}$), said evaluator means including three summers of first current components ($i_{VR}$, $i_{VS}$, $i_{VT}$) determined instantaneously and means for determining the reference values for the control element currents ($i_R$, $i_S$, $i_T$) from the difference of said current components ($i_{VR}$, $i_{VS}$, $i_{VT}$), and for determining reference values for active currents ($i_{WR}$, $i_{WS}$, $i_{WT}$) from the difference of the reference values and the actual values of the control element currents ($i_R$, $i_S$, $i_T$) which control deviations ($x_R$, $x_S$, $x_T$) for controlling firing pulse formers for the compensation control elements to adjust the waveform of the currents on the three-phase side, comprising (a) said evaluator means being in the form of a conductance measuring converter having an output connected to a fourth summer and an active-current reference value generator connected to said fourth summer for determining, continuously in time, the reference values for the active currents ($i_{WR}$, $i_{WS}$, $i_{WT}$), said conductance measuring transformer being acted upon on the input side thereof by the first current components ($i_{VR}$, $i_{VS}$, $i_{VT}$) and the linked load voltages ($u_{RS}$, $u_{ST}$, $u_{TR}$), the active-current reference value generator being additionally acted upon by the linked load voltages ($u_{RS}$, $u_{ST}$, $u_{TR}$) and by the output signal of the conductance measuring transformer, (b) capacitors shunted across the loads in all three phases, (c) said energy accumulator being in the form of an additional capacitor and a resonant circuit, said resonant circuit being tuned to twice the network frequency, (d) said control loop comprising means for regulating the mean voltage ($U_c$) on the d-c side of the compensation control element as well as said evaluator means for controlling the wave-shape of the currents on the three-phase side, (e) said regulating means having an output connected to said fourth summer.

2. Circuit arrangement according to claim 1, wherein the three capacitor phases of said three-phase capacitors have current capacities that are each substantially one-half the magnitude of the largest load current to be compensated in the respective phase.

3. Circuit arrangement according to claim 2, wherein the capacities of said three-phase capacitors are unequal and said three-phase capacitors are delta-connected.

4. Circuit arrangement according to claim 1 wherein said fourth summer comprises means for adding with respect to sign, quantities which are proportional to the resultant conductance of the load and the three-phase capacitor to the reference value of the conductance for the compensation control elements, said active-current reference value generator being in the form of three multipliers having two sets of inputs, to one set of inputs thereof is fed the quantity proportional to the sum of the resultant conductance and to the other set of inputs are fed quantities which correspond to the waveform of the voltages ($u_{RS}$, $u_{ST}$, $u_{TR}$) to which the active-current reference values ($i_{WR}$, $i_{WS}$, $i_{WT}$) to be generated are to be proportional.

5. Circuit arrangement according to claim 1 wherein the compensation control element is in the form of a delta connection of said three four-quadrant control elements.

6. Measured-value converter for a circuit arrangement for compensating and balancing rapidly variable reactive currents of loads connected to three-phase system for determining a component of, or a component proportional to a periodically oscillating electrical reference quantity, and a component from the group of a voltage and a cuurent (i) in accordance with the equation:

$$i_w(t) = (1/TU^2) \cdot u(t) \int_{t-T}^{t} u \cdot i\, dt,$$

where
$i_w$ = active component of the current,
T = period of the reference quantity, of the voltages
U = r.m.s. value of the voltage,
t = time,
and having at least one multiplier on the input side for forming the product of the current and the reference quantity, a dead time member with a signal propogation time equal to the period (T), and at least one integrator, comprising said integrator having controlled resettability, the input of said integrator being connected to the output of said multiplier, so as to sum the output variables, said integrator being resettable after each period (T) to a defined value, a sample-and-hold member operating with the same period (T), the inputs of said dead time member and said sample-and-hold member being jointly connected to the output of said integrator, said sample-and-hold member storing the output variable of said integrator before said integrator is reset, and including at least one summer and another multiplier having first and second inputs, the outputs of said sample-and-hold member, said integrator and the inverted output of said dead time member, are jointly connected to the inputs of said summer, the output of said summer being connected to a first input of said other multiplier the periodic reference quantity being connected to the second input of said multiplier.

7. Measured-value converter according to claim 6, wherein said dead time member is in the form of a series-analog time delay circuit controllable by clock pulses, and including a frequency multiplier, the output of which is connected to the clock pulse input of said time delay circuit, the input of said frequency multiplier being connected to the resetting line of said integrator.

8. Measured-value converter according to claim 7, including a further summer and a further dead time member, the output of which is connected to said other multiplier to complement the signal jointly fed to said other multiplier by a first component in the signal path, the dead time ($T_t$) of said further dead time member having the value $k \cdot T$, k being a constant, the output variable of the further dead time member being amplified by a first factor ($V_1$) and subtracted in said further summer from the common signal, which is first amplified by a second factor ($V_2$) for complementation by a second component.

9. Measured-value converter according to claim 8, wherein the first factor ($V_1$) and the second factor ($V_2$) are equal to twice the reciprocal constant ($\frac{2}{k}$).

10. Measured-value converter according to claim 9, wherein the constant (k) has a value of substantially 0.5.

11. Measured value converter according to claim 6 having digital switching members wherein said sample-and-hold member and dead time member are digital, said summer is analog and has an output and two inputs and including an inverting analog summer having an output, an m-bit analog-to-digital converter connected to the output of said integrator ahead of said dead time ember and said sample-and-hold member in the signal path, two m-bit full summers connected to the outputs of said digital sample-and-hold member and said digital dead-time member, first and second digital-to-analog converters having outputs and being connected between said full summers and said analog summers, said first digital-to-analog converter being connected to an output of said full summers, a further dead-time member having an input and an output, the input of said further dead-time member being connected to an output of said full summers and the output of said further dead-time member being connected to said second digital-to-analog converter, the output of said inverting analog summers which has the input connected to the output of said second digital-to-analog converter, being further connected to one input of said analog summer and the other input of said analog summer being connected to the output of said first digital-to-analog converter, the output of said analog summer being connected to said other multiplier.

12. Measured-value converter according to claim 11, including an additional summer, the inputs of which are connected to the outputs of said further multipliers, the output of said additional summer forming the third proportional current component belonging to a three-phase voltage system from the two first current components which correspond to the multiplier outputs.

* * * * *